United States Patent [19]
Wallace

[11] Patent Number: 5,906,387
[45] Date of Patent: May 25, 1999

[54] RETRACTABLE HITCH FOR A GOOSENECK TRAILER

[76] Inventor: Dean L. Wallace, 5557 Lindford Ave. NE., North Canton, Ohio 44721

[21] Appl. No.: 08/781,680

[22] Filed: Jan. 10, 1997

[51] Int. Cl.⁶ .................................................. B60D 13/00
[52] U.S. Cl. .................................... 280/491.3; 280/491.1; 280/457
[58] Field of Search ................ 280/491.1, 491.3, 280/491.5, 90, 457, 458

[56] References Cited

U.S. PATENT DOCUMENTS

| | | |
|---|---|---|
| 2,494,799 | 1/1950 | Duvall .................................. 280/491.3 |
| 3,865,048 | 2/1975 | Wallace . |
| 4,180,281 | 12/1979 | Tertinek . |
| 4,256,324 | 3/1981 | Hamilton . |
| 4,540,194 | 9/1985 | Dane . |
| 4,570,966 | 2/1986 | Giboney et al. . |
| 4,807,900 | 2/1989 | Tate ..................................... 280/491.3 |
| 5,016,898 | 5/1991 | Works et al. . |
| 5,143,393 | 9/1992 | Meyer . |
| 5,263,735 | 11/1993 | Mann . |
| 5,435,585 | 7/1995 | Chambers . |
| 5,472,222 | 12/1995 | Marcy . |

FOREIGN PATENT DOCUMENTS 2227-739  12/1974  France .

*Primary Examiner*—Robert J. Oberleitner
*Assistant Examiner*—C. T. Bartz
*Attorney, Agent, or Firm*—Samuel B. Laferty

[57] ABSTRACT

A retractable ball or kingpin hitch is provided for the load bed of a vehicle. The retractable ball or kingpin hitch is provided with a movable pin mounted in a wall of the hitch for locking the ball or kingpin in an upright operational position. The locking feature assures that the retractable ball or kingpin will not be able to partially retract thereby compromising the effectiveness of the hitch and coupling when hauling a trailer.

18 Claims, 2 Drawing Sheets

RETRACTABLE HITCH FOR A GOOSENECK TRAILER

FIELD OF THE INVENTION

A retractable ball or kingpin hitch is described for the use in a load bed of a vehicle. The hitch mechanism for a load bed enables a vehicle to pull what is known as a gooseneck trailer or a fifth wheel trailer. The retraction of the ball of kingpin is desirable to allow other loads to be hauled in the load bed.

1. Background of the Invention

Retractable ball hitches for the load bed of a vehicle are known. A preferred ball hitch is one that pivots from an upright position to a retracted position in the load bed of a vehicle. Desirably a cover plate opposite the ball lifts and allows the ball to be retracted into or withdrawn from a recessed area in the hitch mechanism. A drawback of this style of pivotally retracting ball hitches is that the cover plate is the only means for preventing the ball hitch from reverting from the stationary position back to the retracted position. Another drawback is that dirt or other contaminants enter into the ball hitch mechanism through cracks between the components. These contaminants can cause the cover plate to insecurely hold the ball hitch in the upright position which can cause a failure of the ball to remain in an upright position. If the ball is not secured in the upright position damage to either the ball hitch mechanism or the latch from the trailer, engaging the ball hitch, or both will occur. Ultimately this causes a disconnection between the trailer and the vehicle if the damaged parts aren't repaired or replaced.

2. Summary of the Invention

A retractable hitch mechanism is provided wherein a ball or kingpin is mounted to or is an integral part of a pivotally mounted base in the hitch mechanism. The hitch mechanism further comprises a substantially flat face plate having an aperture therein of sufficient size for the ball or kingpin to be retracted below the surface of the face plate or pivoted into an operable position extending generally upright above the face plate. Two metal walls extend below the face plate to mount the pin for the pivotally mounted base. Desirably the walls extend perpendicularly below the face plate. A second pin is mounted on one of said walls. Said second pin being so located that when the ball or kingpin is in the upright operable position the pin blocks the pivotally mounted base preventing any pivoting and thereby locking the ball or the kingpin in a substantially upright position until released. A cover plate for said aperture in the face plate can cover the remaining open space in the face plate not occupied by the ball or kingpin when upright or the remaining open space not occupied by a face of the pivotal base when the ball or kingpin is retracted. The closure of the aperture in the face plate by the cover plate and the pivotally mounted base prevents dirt or other contaminants from entering the mechanisms of the hitch. The cover plate can also block the ball or kingpin from retracting into the hitch mechanism while a trailer is attached to the ball or kingpin.

DETAILED DESCRIPTION OF THE PREFERRED EMBODIMENT

Figure 1:
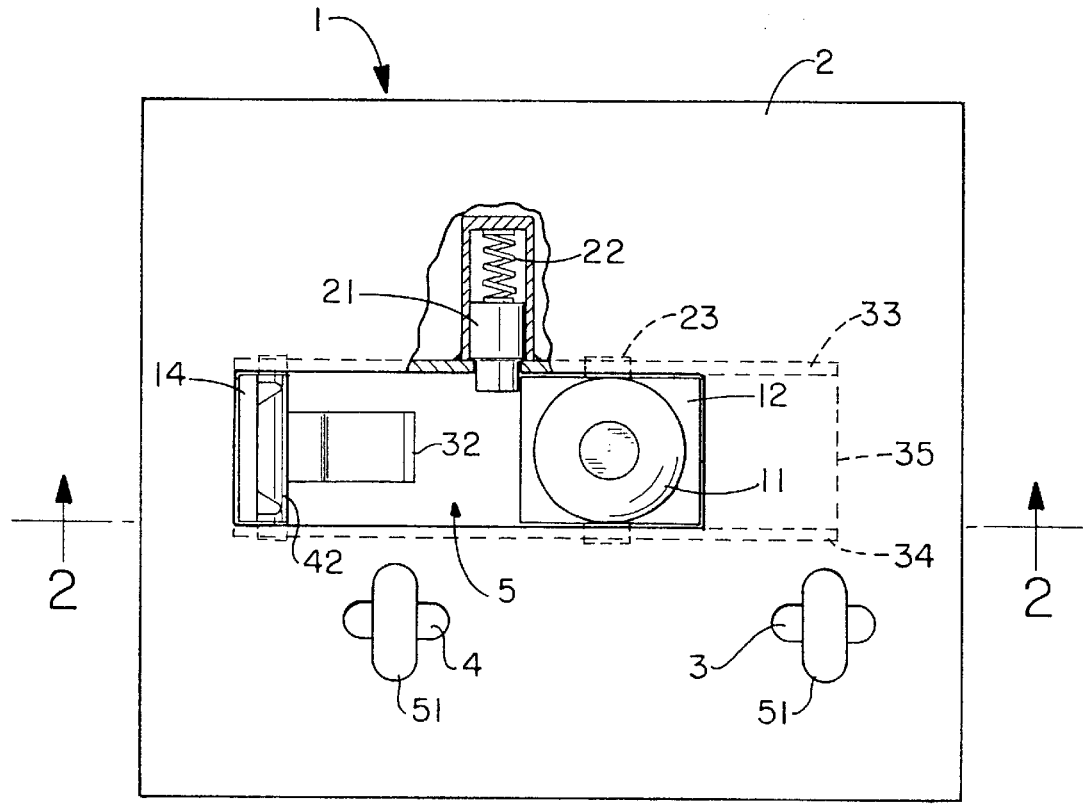
FIG. 1 is a top view of a hitch mechanism in accordance with the present invention with portions broken away for the purpose of the description and wherein the bottom of the figure is toward the rear end of a vehicle utilizing the mechanism.
Figure 2:
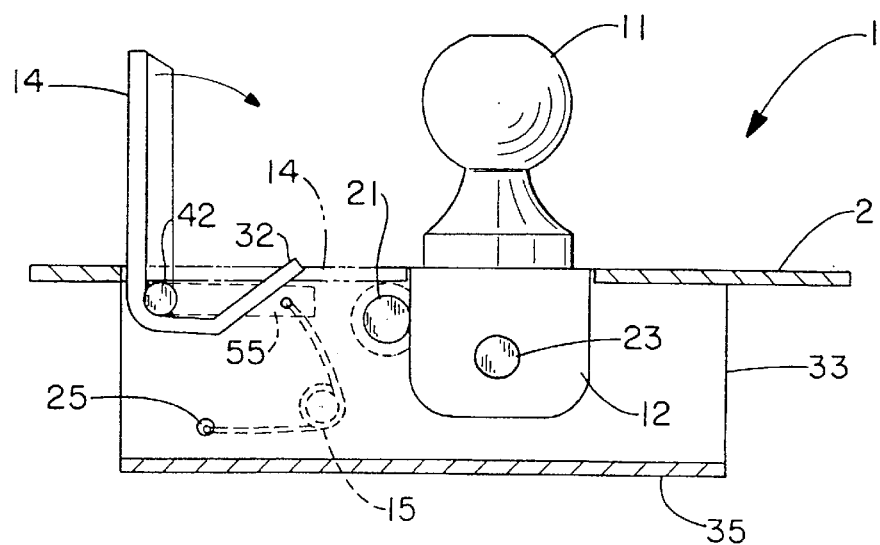
FIG. 2 is an elevational view as may be taken at line 2—2 of FIG. 1 showing a ball hitch in an upright operable position, a pin mechanism in locking position and, a closure latch in the open position as shown by solid lines and in a closure position as shown by ghost dot-dashed lines.

A hitch 1 is shown in FIG. 1 with the face plate 2 having apertures 3 and 4 for attaching safety chains to the hitch and aperture 5 providing clearance for the pivoting of the base 12 and ball 11 or kingpin 13 (shown with ghost lines in FIG. 3) to go back and forth from the retracted and operative positions. A cut away of the plate in the region of the movable pin shows movable pin 21 and a spring 22 extending said movable pin to block the retraction of the ball or kingpin below the face plate of the hitch mount 1. FIG. 2 shows a view of the hitch mechanism with a ball 11 as a hitching mechanism and a spring loaded cover plate or latch 14 covering the remainder of the aperture when the ball is in the upright position. The cover plate 14 is pivotally mounted on pin 42 which extends generally from wall 33 to wall 34. Also shown is an attachment site 25 known as a spring anchoring means, a spring 15, a pivotal base 12 of the hitch mount 1, a pin 23 on which the base and the ball pivot, a face plate 2, and the end of a spring loaded pin 21 used to secure the ball hitch in the upright position.

Figure 3:
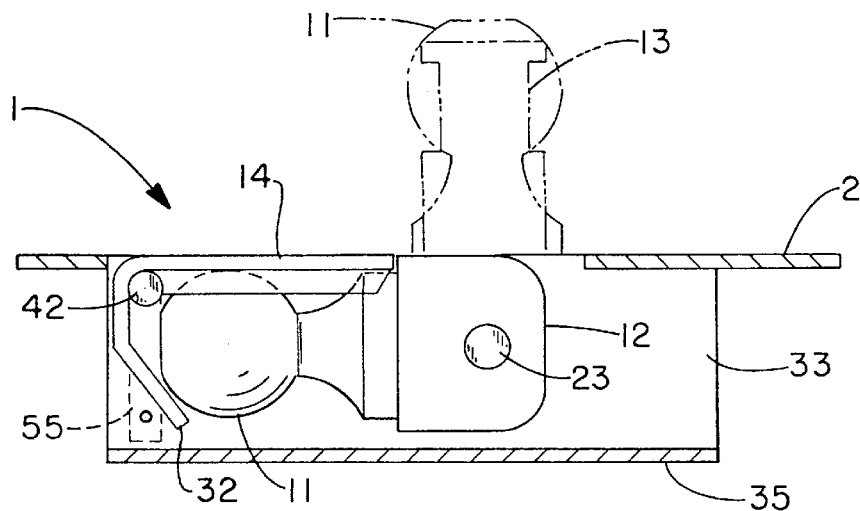
FIG. 3 is a view similar to FIG. 2 but showing the ball hitch in a retracted stowed position within the mechanism.
Figure 4:
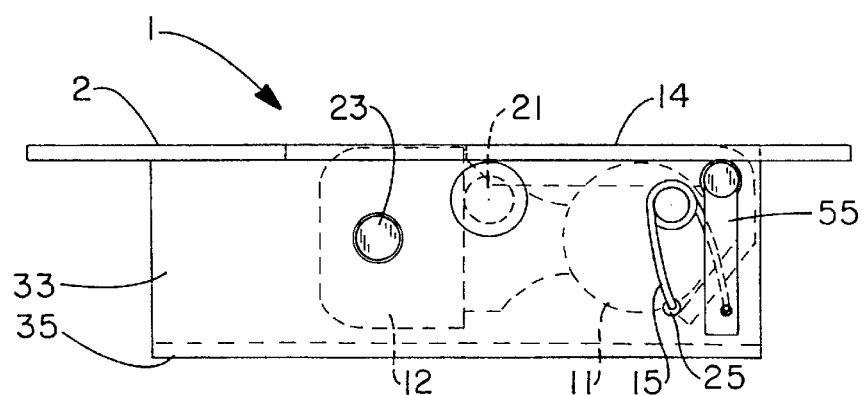
FIG. 4 is an elevational view from the opposite position of FIG. 2 showing the ball hitch in the stowed position and the latch in the closure position.

FIG. 3 shows an end view of the ball hitch mechanism with the ball 11 in a retracted position. The ball 11 and kingpin 13 are shown in operative positions in the ghost line. The kingpin is similar to the kingpin of a truck semi-trailer combination. However, in this disclosure the kingpin is mounted to the truck and the fifth wheel is mounted to the trailer. FIG. 4 shows how a spring 15 could be attached to a spring anchoring means 25 and a side arm 55 for the cover plate 14 to hold the cover plate in a down position while the ball 11 or kingpin 13 are in the retracted or upright positions. When the ball is in the upright operable position as shown in FIG. 2 the cover plate 14 restrains the pivoting base and ball (or kingpin) from going into the retracted position.

Figure 5:
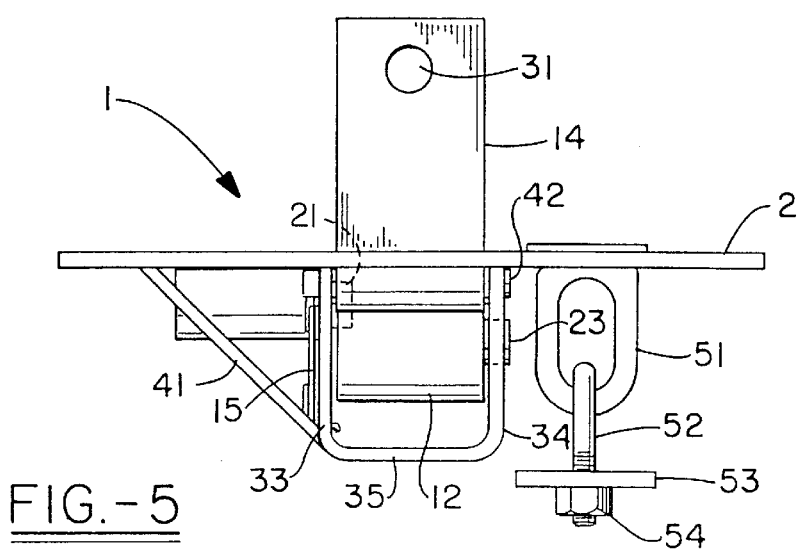
FIG. 5 is a left side elevational view taken from FIG. 2 showing various structural members comprising the mechanism.

FIG. 5 shows a side view of the hitch mechanism with the cover plate 14 in an open position and having an aperture 31 in the cover plate to facilitate opening the cover plate. FIG. 5 also shows the first ring 51 having at least one dimensionally larger portion which cannot pass through an aperture such as aperture 3 or 4. The ring 51 has interconnected therethrough another ring or u-bolt 52, the u-bolt has a metal element 53 connecting the two opposing legs of said u-bolt. The interconnecting metal element 53 is attached to the opposing legs of the u-bolt with a fastening mechanism such as a nut 54 on each opposing leg. FIG. 5 also shows the walls 33 and 34 which support the pin 23 shown in FIGS. 2, 3 and 4. In FIG. 5 an added element, plate or web 35, is shown connecting the most distal ends of wall elements 33 and 34. The elements 33, 34 and 35 are actually a u-channel of appropriate width and depth welded to the face plate 2 near the aperture 5 in the face plate. Also shown is an optional bracing element 41 spanning between wall 33 and the face plate 2.

The retractable hitch is designed to be mounted in the load bed of a vehicle such as a pick-up truck, jeep, traction engine, etc. to facilitate pulling a trailer or other load safely. The attachment of the hitch to the load bed is desirable because loads attached in the load bed and desirably near the rear axle of the vehicle are more easily supported by the rear springs, axle etc. than loads attached on the rear bumper of the vehicle, possible 2 or 3 or more feet beyond the rear axle. The leverage of loads attached at a distance behind the rear axle can shift weight from the front axle to the rear axle causing the wheels of the front axle to have decreased traction and this can interfere with the steering and braking of the front wheels. The weight shifted from the front axle is an additional burden on the rear axle. Further larger loads on the vehicles can be tolerated when attached near the rear axle rather than when attached at a distance 2 or 3 feet behind the rear axle.

The face plate 2 of the hitch mount provides a means for securely attaching the retractable hitch to the load bed of a vehicle. A hole of sufficient size is cut in the load bed of the vehicle to allow the hitch to be mounted with the face plate and flush components thereto to be essentially the only part of the hitch extending above the load bed when the ball or kingpin is in the retracted position. Desirably structural members such as I-beam, channel, or angle iron are attached to the frame below the load bed to support the hitch. They would span from the left to the right frame members of the vehicle below the face plate 2. Holes are drilled in the face plate 2 and bolts or other attachment means e.g. welding rivets, etc. are used to secure the face plate 2 to one or more structural members connected to the frame of the vehicle.

Desirably the hitch is completely premanufactured and assembled, except for the structural members spanning the left and right frame members, before it is installed in the load bed. The walls 33 and 34 can be attached to the bottom of the face plate 3 on alternate sides of aperture 5 or can be installed to extend up into the aperture 5 being essentially flush to the face plate. A preferred method of construction is to use a u-channel of appropriate width, depth and thickness to form the first and second wall 33 and 34. A benefit of the u-channel is that it provides a bottom in the retractable hitch mechanism and additional strength and rigidity. The wall or walls 33 and 34 generally support pin 23, pin 42, pin 21, and spring attachment means 25. Additional metal elements such as bracing means 41 may be attached or welded to the underside of the face plate and walls 33 and 34 to provide additional rigidity or strength as needed for particular applications.

Pin 23 for the hitch is mounted into the walls 33 and 34. Mounting of pin 23 can be achieved by use of bolt for pin 23 or by welding pin 23 to walls 33 and 34 or alternate conventional means for attaching pins. Generally the hitch is mounted in the load bed of a vehicle so that pin 23 is generally parallel with the frame members of the vehicle. Thus the strains of vehicular forward acceleration and deacceleration are perpendicular i.e. not parallel to the pivoting action of the ball or kingpin.

The base 12 of the unit which pivots on the pin 23 is generally a square or rectangular element with sufficiently rounded or beveled corners to facilitate pivoting within the hitch. A ball 11 or kingpin 13 can be an integral part of the base or can be attached to the base via a mechanical means (e.g. using a helically threaded hole in one component and a matingly threaded projection in the other component to couple by interlocking the threads) or welding or both. Desirably the base 12 has at least two parallel faces that face the walls 33 and 34. It has been found that generally flat parallel faces on base 12 adjacent to walls 33 and 34 helps to minimize twisting strain during trailering on pin 23.

Desirably the base 12 also presents a generally flat face flush with the face plate 2 in the load bed when the ball or kingpin is in the fully retracted position as shown in FIG. 3. In FIG. 3 the top face of the base 12 exposed in the aperture 5 in the face plate 2 and beyond the cover plate 14 would desirably extend from the cover plate 14 to the face plate 2 with only a small crack to provide clearance when the ball or kingpin is retracted.

The base 12 desirably has another face that contacts detent or pin 21 when the ball 11 or kingpin 13 is in the upright operable position. This is shown in FIGS. 1 and 2 from two different perspectives. The base 12 need not present a flat face to the detent or movable pin 21 but desirably the face of base 12 abutting pin 21 exerts only lateral forces (i.e. forces parallel with the pivoting action of base 12) to pin 21 during trailering. In some embodiments a portion of the base 12 can be machined to accommodate a portion of any particular shape of pin 21 desired (e.g. if pin 21 is a hexagonal pin). The fact that the ball or kingpin are locked in an upright position can be confirmed by visual inspection of movable pin 21 prior to closing the cover plate 14. The detent or movable pin 21 provides additional safety as a visually confirmable lock on the pivoting action of the ball 11 or kingpin 13. A preferred pin 21 is a rod slidingly engaged in a tube welded to wall 33 or 34 such that the tube and rod are perpendicular to walls 33 and 34 and parallel to the face plate 2 and to pin 23. Such a pin would move on a longitudinal axis parallel to the face plate and perpendicular to said walls. The rod can be extended from one wall towards the other wall by means of a spring (e.g. helical) mounted in or onto said tube. A preferred means for retracting said rod (pin 21) could be to manually push the rod back into the tube until the rod is flush or recessed into the wall whereby the pivotal base is freed to pivot to a retracted position.

A cover plate 14 as shown in FIG. 2 is desirable to generally close the remainder of aperture 5 not occupied by base 12 in the face plate 2 when the hitch is in the operable or retracted position. The cover plate 14 can also operate as a second restraint mechanism to restrain the ball or kingpin from retracting into the hitch mechanism when a trailer is being towed. As shown in FIG. 2 a spring 15 can be attached to the cover plate 14 via a side arm 55 for the cover plate. The spring can be attached through a spring anchoring means 25 to a wall of the hitch. In one embodiment the side arm 55 for the cover plate 14 is on the outside of wall 33 or 34 attached via pin 42. Pin 42 provides a pivotal attachment means for cover plate 14. Pin 42 may pivot in the hitch 1 or it can be immovably mounted in hitch 1 and then the cover plate 14 would pivot on pin 42. Alternative to the side arm 55 and attachment of the spring 15 other types of springs can be used.

FIG. 2 illustrates the spring and side arm 55 attachment when a cover plate is in the up position while FIG. 4 illustrates the spring and side arm position while the cover plate is in the down position. As shown in FIG. 3 the cover plate, the spring and the side arm will be in the same position irrespective of whether the ball or kingpin is in the upright operable position or is in the retracted position. FIG. 3 illustrates that the cover plate 14 can have a bottom portion 32 which serves to lift the ball hitch or kingpin from the retracted position as the top of the cover plate is lifted. FIG. 5 shows an aperture 31 in the cover plate 14. Said aperture can be used for gripping the cover plate when it is in the down position and exerting an upward force to open the cover plate lifting the ball or kingpin.

FIG. 5 also shows a means for attaching a safety chain to the hitch. The safety chains would extend down from a gooseneck or fifth wheel trailer. Under the laws regarding trailers, safety chains may be required and would need to be firmly attached to the vehicle. The means for attaching a safety chain shown in FIG. 5 comprises a first ring 51 which may be round or elongated and has a sufficient cross section to bear an appropriate load. This ring 51 can also be considered as the receiving link for a hook or other fastener from the safety chain from the trailer. A ring can be a chain link or other continuous loop having constant or irregular radius of curvature or other coupling means such as a FIG. 8 link. It can be oblong or have one or more other ring like shapes. It may be a u-shaped element with a bridge element spanning and connecting the opposite legs. It is desirable that the aperture in ring 51 be a sufficient diameter and length to facilitate receiving a hook or coupling means from the trailer. Ring 51 has a portion having a larger dimension in one direction or optionally in multiple directions than the rest of ring 51. In FIG. 5 the larger portion is shown extending slightly above plate 2 and appears to have at least greater width than the maximum width of the ring 51 (measured from the outside of the left portion of the link to the outside of the right portion of the link when the link is held upright. Optionally the larger dimension could be a thickness of the ring 51 such that one end of the ring has a thickness or a thick appendage attached thereto that is greater in thickness of the remainder of the ring. Desirably the portion of ring 51 having at least one larger dimension would create a fairly flat service rising only slightly above the face plate 2 so they would not unduly interfere with loads placed in the load bed or on face plate 2. When not coupled with a safety chain, ring 51 would automatically (due to gravity) drop to a stowed position with just the larger dimension portion of the ring extending above face plate 2.

Coupled through ring 51 is another ring 52 or optionally a ring made from a u-shaped element with a bridge element spanning and connecting the opposite legs. Another ring could have the same size and shape and a large dimension as ring 51 or could be another size with a different larger dimension than that of ring 51. If ring 52 is a u-shaped element such as a u-bolt it desirably has a metal element 53 connecting the two opposing legs of u-shaped element 52 with said metal element 53 being securely affixed to the u-shaped ring 52 by means of a fastener 54 which can be a mechanical means such as a nut on each opposing leg or can be a physical means such as welding. If ring 52 is a u-shaped element, desirably the plate or the metal element 53 or the fastening means 54 has at least one dimension large enough that it cannot pass through the aperture 3 or 4 in the face plate 2. The use of a u-bolt is preferred as it provides a mechanical means to remove and service or repair the means for attaching a safety chain.

The apertures in face plate 2 are desirable as shown in FIG. 1, e.g. apertures 3 and 4. The aperture can have another shape as long as the ring elements or u-shaped element 51 and 52 are appropriately sized and dimensioned relative to the respective aperture so at least a portion of each ring or u-shaped element does not pass through aperture 3 or 4. A preferred aperture shape is shown in FIG. 1 wherein two slots generally perpendicularly to each other and optionally bisecting each other are machined into the face plate 2. This allows one slot to accommodate the partial entry and removal of ring 51 while the perpendicular slot accommodates the partial entry and penetration of ring 52 which is in the example shown to have its largest cross sectional dimension perpendicular to the largest cross sectional dimension of ring 51. The apertures 3 and 4 shown in FIG. 1 also facilitates the use of a finger or optionally a screw driver or other prying instrument to enter the aperture perpendicular to the width of ring 51 and pry ring 51 upward from its fully recessed position in face plate 2. Desirably ring 51 has sufficient size and elevation above face plate 2 when in the stowed position so that an individual's finger can be inserted into the slot perpendicular to the width of ring 51 and subsequently pull ring 51 up through aperture 3 or 4 and allow a safety chain to be connected to ring 51. When a pulling force is applied to ring 51 by safety chain connected to a trailer it can pull ring or u-bolt 52 partially through aperture 3 or 4 but not completely through aperture 3 or 4. Thus the ring 51 and u-bolt 52 acts as anchoring means for a safety chain attached to ring 51.

FIG. 5 also shows additional structural element 41 which can provide additional support or strength to the hitch.

The metals of the retractable hitch can be any appropriate metals or alloys thereof and can be coated painted etc. Nonmetallic parts may be substituted where they offer acceptable performance. Often the ball 11 is chrome plated. The rings 51 or ring or u-bolt 52 should desirably be of sufficient dimension and made of materials to withstand appropriate loads. The thickness of the face plate 2 and walls 33, 34, etc. are adjusted according to the intended load to be applied in the form of a trailer.

While in accordance with the patent statutes the best mode and preferred embodiment has been set forth, the scope of the invention is not limited thereto, but rather by the scope of the attached claims.

What is claimed is:

1. A retractable hitch mount, comprising;
   a) a metal face plate with a first aperture therein,
   b) at least a first and a second metal wall extending below said face plate and being on alternate sides of said first aperture,
   c) a first metal pin mounted parallel to said face plate, and secured into said first and second walls,
   d) a pivoting base mounted on said first metal pin,
   e) a ball or kingpin mounted to said base or being an integral part of said base,
   whereby said ball or kingpin can, by pivoting said base on said first metal pin, move between an upright position through said first aperture and a position where said ball or kingpin is retracted below the face plate further including a movable pin secured to said first or second wall, said pin being capable of locking said pivoting base and said ball or kingpin in an upright position by protruding from said first or second wall when said ball or kingpin is in the upright position and abutting a face of said base, said face only exerting lateral forces on said pin, further wherein a visual inspection of said movable pin through said first aperture can confirm if it is in the protruding position and wherein said pin is capable of being manually rushed from a protruding to a retracted position when said ball or kingpin is in the upright position via access through said first aperture.

2. A retractable hitch according to claim 1, further including an interference member which prevents said pivoting base from going beyond the upright position when going from a retracted position to an upright position and wherein said pin is a movable pin which can protrude from either said first or said second wall and lock said pivoting base by abutting it.

3. A retractable hitch according to claim 2, including a cover plate and a second pin, said cover plate being pivotally mounted on said second pin, said second pin being parallel to said face plate, said cover plate being sized and located to partially close said first aperture in said face plate when in the down position and said cover plate having a spring attached thereto for the purpose of holding the cover plate in the down position.

4. A retractable hitch according to claim 2, wherein said movable pin moves along a longitudinal axis parallel to said face plate and perpendicular to said walls and is biased beyond one wall toward the other wall by the force of a spring, and wherein said first and second metal walls are mounted perpendicular to said face plate.

5. A retractable hitch comprising:

a metal face plate with a first aperture therein;

at least a first and a second metal wall extending below said face plate and being on alternate sides of said first aperture;

a first metal pin mounted parallel to said face plate, and secured into said first and second walls;

a pivoting base mounted on said first metal pin;

a ball or kingpin mounted to said base or being an integral part of said base; whereby said ball or kingpin can by pivoting said base on said first metal pin move between an upright position through said first aperture and a position where said ball or kingpin is retracted below the face plate;

an interference member which prevents said pivoting base from going beyond the upright position when going from a retracted position to an upright position; and a movable pin secured to said first or second wall capable of locking said pivoting base and said ball or kingpin in an upright position, which pin can protrude from either said first or said second wall and lock said pivoting base in an upright position by abutting it, wherein said hitch further includes at least one means for attaching a safety chain, said means comprising;

an orientated first ring having an end with at least one dimension larger than the rest of the ring, a second aperture in the face plate sized such that the first ring except for said at least one dimension larger than the rest of the ring can pass through it, a second ring, being physically coupled through said first ring such that either the first ring or the second ring or both the first ring and the second ring are present in said second aperture and wherein said second ring has one dimension of sufficient size to prevent said second ring from passing completely through said second aperture.

6. A retractable hitch according to claim 5, wherein said second aperture comprises two perpendicular slots which intersect each other.

7. A retractable hitch according to claim 5, wherein said second ring is a u-shaped element having two legs and a bridge between the two legs, said two legs being interconnected with said bridge which is secured to said two legs, and wherein said bridge has at least one dimension of sufficient size to prevent said ring from passing through said second aperture.

8. A retractable hitch mount for the load bed of a vehicle, comprising;

a) a face plate having a first aperture therein of sufficient size for a pivotally retractable ball or kingpin to pass there through, b) at least first and second metal walls mounted to said face plate on alternate sides of said first aperture and extending below said face plate, c) a first pin spanning from said first to said second metal wall, d) pivotally mounted on said first pin, a base unit and a ball or kingpin, whereby said ball or kingpin can be pivoted between an upright position extending above said face plate and a retracted position below said face plate, further wherein a physical stop prevents said ball or kingpin from pivoting past an upright position, and e) a movable pin mounted to said first or said second metal wall, said pin being capable of extending beyond said wall and abutting a face of said pivoting base when said ball or kingpin is in an upright position, thereby locking said ball or kingpin in an upright position, said face only exerting lateral forces on said pin, the position of said movable pin abutting said base being visually confirmable through said first aperture and said movable pin being accessible through said first aperture and being capable of being manually pushed towards said wall to allow said base to pivot into a position wherein said ball or kingpin is pivotally retracted below the face plate.

9. A retractable hitch mount of claim 8, wherein said first and second walls are mounted perpendicular to said face plate and said movable pin moves on a longitudinal axis substantially perpendicular to said first or second wall and parallel to said face plate and extends beyond said walls to lock said base and ball or kingpin in an upright position and can be pushed to a position flush or recessed into said wall to allow said base to pivot into a retracted position for said ball or kingpin.

10. A retractable hitch mount of claim 8, mounted in the load bed of a vehicle.

11. A retractable hitch mount of claim 9, mounted in the load bed of a vehicle.

12. A retractable hitch mount of claim 5 said first ring and said second ring being physically interlocked in the presence of said face plate such that said first ring and said second ring can be moved within said second aperture but they cannot simultaneous be removed from said second aperture without fracturing said first or second ring.

13. A retractable hitch mount of claim 12, including two of said means for attaching a safety chain wherein said second aperture comprises two intersecting slots.

14. A retractable hitch mount of claim 13, wherein said slots are perpendicular and bisect each other.

15. A retractable hitch mount according to claim 13, wherein the larger end of said first ring includes an oblong or rectangular face which covers one of said slots in said second aperture in said face plate when said first ring is fully inserted into said second aperture.

16. A retractable hitch according to claim 13, including a hinged cover plate to partially cover said first aperture.

17. A retractable hitch according to claim 16, wherein said first and second walls are interconnected by a plate connecting their ends most distal from the face plate.

18. A retractable hitch according to claim 12, wherein said second ring is a u-shaped element with a bridge element spanning the two opposing legs of said u-shaped element, wherein said bridge is the dimensional portion of said second ring which cannot completely pass through said aperture, and wherein said first and second rings are interlocked so said bridge element is below said face plate.

* * * * *